Nov. 14, 1967    H. S. STARBUCK    3,352,628
IODINE VAPOR GENERATOR AND METHOD OF USING
IT TO TREAT AND DISINFECT A FLUID
Filed May 3, 1965    4 Sheets-Sheet 1

INVENTOR.
HERMAN S. STARBUCK
BY
J. Warren Kinney, Jr.
ATTORNEY

Nov. 14, 1967   H. S. STARBUCK   3,352,628
IODINE VAPOR GENERATOR AND METHOD OF USING
IT TO TREAT AND DISINFECT A FLUID
Filed May 3, 1965   4 Sheets-Sheet 2

INVENTOR.
HERMAN S. STARBUCK
BY
J Warren Kinney Jr.
ATTORNEY

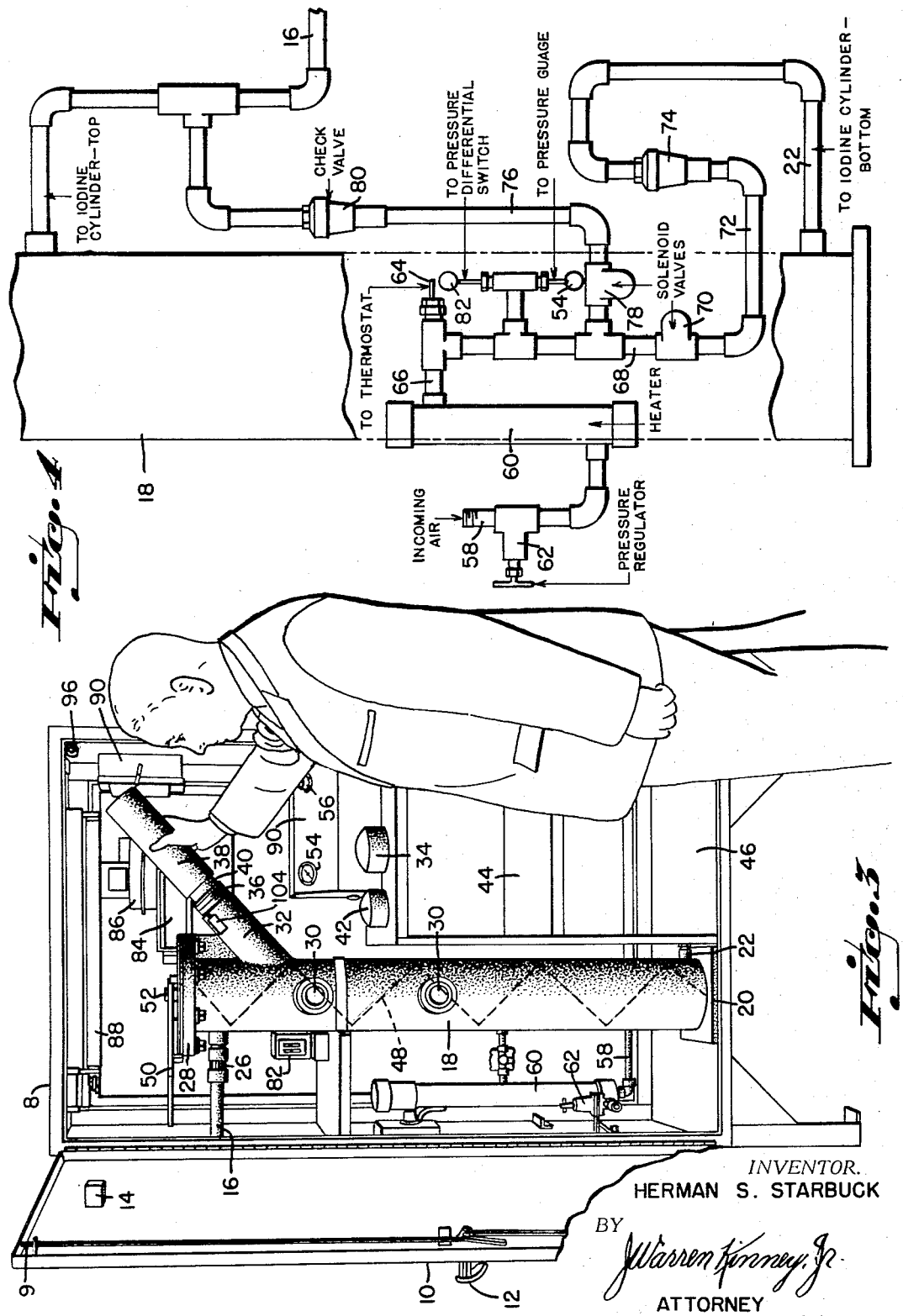

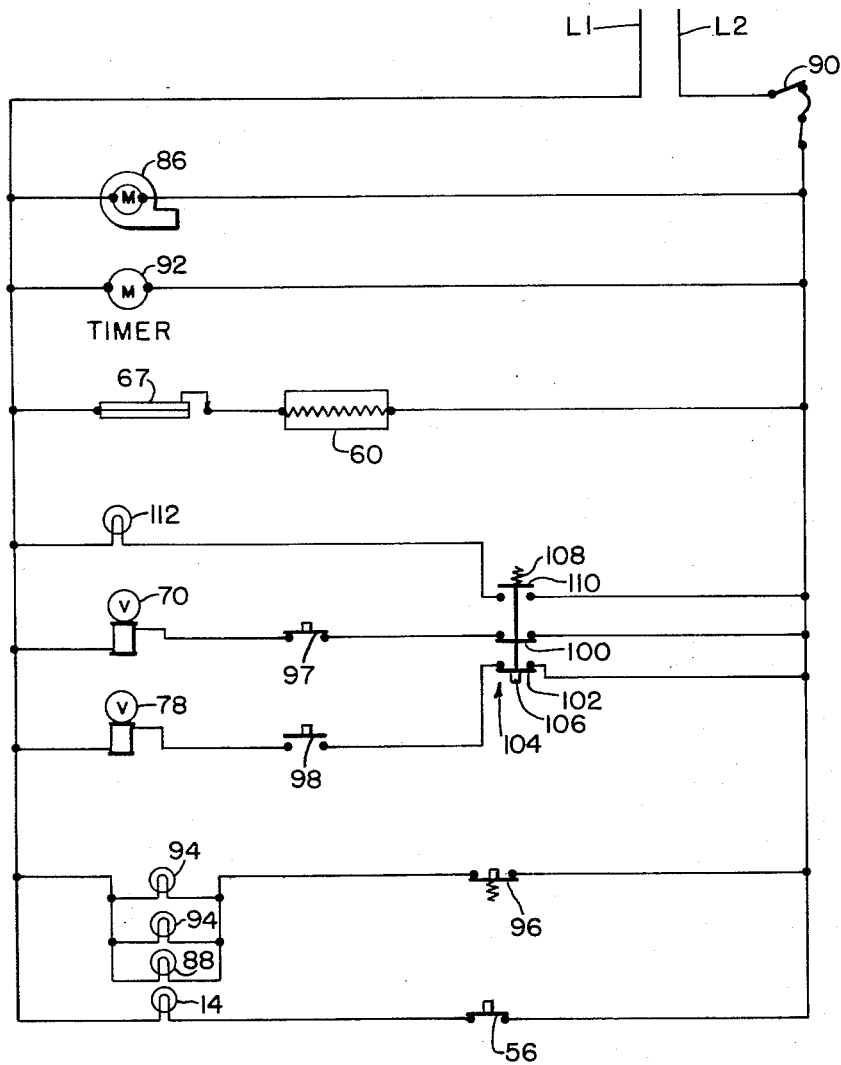

3,352,628
IODINE VAPOR GENERATOR AND METHOD OF
USING IT TO TREAT AND DISINFECT A FLUID
Herman S. Starbuck, 8105 Remington,
Cincinnati, Ohio 45242
Filed May 3, 1965, Ser. No. 452,712
16 Claims. (Cl. 21—58)

ABSTRACT OF THE DISCLOSURE

An iodine vapor generator including means for selectively directing a flow of gas under pressure through a housing containing iodine crystals for forming an iodine vapor therewith which vapor is then directed to an area where it is desired to control bacteria and odors in the air and/or liquids.

The present invention relates to a method and apparatus for generating iodine vapor. Iodine vapor may be used commercially as a bactericide or disinfectant in the treatment of various gases and liquids, to promote or preserve the purity thereof. For example, it may be used for disinfecting the water of swimming pools, or for controlling bacteria and odors in air and liquids to be maintained in an antiseptic, wholesome condition.

Iodine vapor used as a bactericide or disinfectant has many advantages over chlorine or phenol currently used for the same purposes. It is less of an irritant to parts of the human body than is chlorine, when mixed with water or air in proportions necessary to effectively control bacteria in water or air which comes into contact with human bodies. Iodine, unlike phenol, has long-term effectiveness as a bactericide, and in a gas or liquid vehicle it may be disposed of, when necessary, without objectionably polluting the air or any water courses into which it may be discharged.

To mention a few additional uses for iodine vapor: it may be disseminated in air to control odor and bacteria in hospitals, laboratories, meat processing plants, and in various fields of endeavor where cleanliness and purity of air is considered necessary or desirable; iodine vapor may be used to advantage in treating water and other liquids whch tend to become sour or rancid, as in the production of paper pulp slurry, and in various reclamation processes wherein bacterial growth presents a serious problem; in manufacturing plants utilizing metal-working machinery, iodine vapor is used with great effectiveness in preserving and extending the useful life of coolants applied to the cutting and shaping tools, which coolants usually contain ingredients subject to rancidity or deterioration due to bacterial growth.

The foregoing paragraphs mention only a few of many applications for which iodine vapor is suited. In general, the use of iodine vapors in controlling bacteria and odors results in substantial savings due to its long-term effectiveness, and the ease with which substances carrying the iodine may be disposed of, to the atmosphere or to sewers or water courses, without creating hazardous or otherwise objectionable conditions. Moreover, the equipment needed to generate the iodine vapor is simple and inexpensive, and demands a minimum of maintenance attention.

An object of the present invention is to provide a highly efficient method and means for generating and delivering iodine vapor in commercial quantity, for the treatment of a fluid vehicle such as a gas or liquid, to control odor and bacterial growth within the vehicle.

Another object of the invention is to provide an iodine vapor generator which is automatic in operation, and which may be serviced when necessary, without subjecting the serviceman to injurious fumes or burns.

A further object is to provide a method and means for generating and delivering iodine vapor at low cost, and with a minimum of maintenance expense.

Another object is to provide an iodine vapor generator in unit form, to facilitate and expedite shipment, installation, and maintenance thereof.

A further object of the invention is to provide a generating unit for the purposes stated, which possesses great durability and resistance to any disabling effects of the iodine generated thereby, so that treatment of a gaseous or liquid vehicle may continue throughout an extended period of time, without interruption such as might curtail any operation which may be dependent upon continuity of treatment.

The foregoing and other objects are attained by the means described herein and as illustrated upon the accompanying drawings, in which:

FIG. 3 is a view similar to FIG. 2, illustrating how the device may be serviced when necessary.

FIG. 4 is a schematic view, illustrating various components of the device and their arrangement with respect to the cabinet.

FIG. 5 is a wiring diagram illustrating a control system for the device of the invention.

Figure 1:
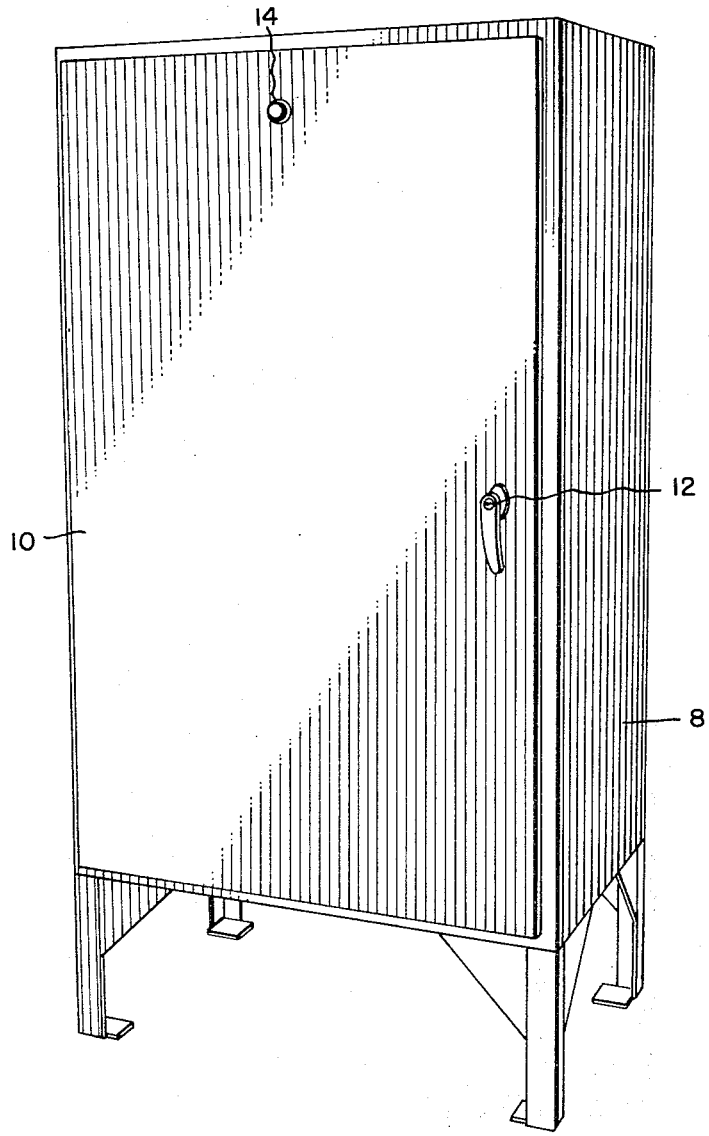
FIG. 1 is a perspective view of the device of the present invention, as unitized for installation at any service location.

The treatment device or apparatus preferably includes an enclosing case or cabinet 8, provided with a lockable access door 10 and bolt means 9 to prevent tampering, or unauthorized manipulating of the controls encased within the cabinet. The door may be furnished with a key lock 12, or its equivalent, for the purpose stated. Upon the front of the door, or at another convenient location, may be installed a signal lamp 14 or other indicator for signalling the need for replenishing the supply of treatment material, usually iodine crystals, consumed during operation of the apparatus, as will later be explained in greater detail.

Treatment material, or iodine in vaporous or gaseous form, is delivered by the apparatus through a pipe 16 of non-corrosive substance. The pipe may terminate within a coolant tank, which term is used broadly to comprehend, by way of example, a sump, storage tank, or reservoir containing a liquid vehicle requiring treatment, or, if the vehicle is a gas, the pipe may lead to a suitable compartment or mixing station where the iodine vapor may be sprayed or otherwise intimately dispersed within the gaseous vehicle requiring treatment.

The treatment material employed may be produced from iodine crystals, or salts of iodine which will yield iodine vapor when washed by a stream of air or other gas in heated condition. The use of an inert gas such as heated air, is preferred as the iodine sublimator, due to its low cost and ready availability. The iodine released by the crystals or salts is readily dispersed in a gaseous or liquid vehicle, and has lasting and effective disinfecting qualities. Most liquids so treated usually require infrequent replacement, so the problem of disposal is greatly minimized and facilitated. Moreover, iodine in the quantity used for disinfecting a liquid such as water, is disposable easily and safely by dilution in air or water, when necessary.

In the drawings, the numeral 18 indicates a fixed hollow container or tube constructed of a material highly resistant to the corrosive effects of iodine, one such material being PVC (polyvinyl chloride), for example. The container has a leak-proof bottom closure member 20, and an adjacent intake pipe 22 for delivering a heated gas or vaporizing medium to the lower end of the container. The vaporizing medium, in metered quantity, passes upwardly through the crystals or other iodine-bearing material encased within the container 18, and is released as iodine vapor through the upper outlet pipe 16 coupled to the container by coupling fitting 26. A removeable leak-proof cap or head 28 may be securely bolted or otherwise fixed to container 18 for closing the upper end thereof.

Container 18 may be provided with a plurality of sight-glassed inspection ports 30, located at different elevations upon the container, and through which may be observed the level of charge held by the container. The ports 30 preferably are interiorly illuminated, for ease of inspection. As will be understood, the charge of iodine-bearing material within the container is gradually dissipated, and may settle within the container as the vapor is released through outlet pipe 16. When the level of iodine-bearing material reaches a lower inspection port, replenishment of the supply is called for as will be explained.

Above the uppermost inspection port, container 18 may be provided with a charging port 32 whereby the supply of iodine-bearing material within the container may be replenished. The charging port normally is closed by a leakproof removable cap 34. In the example illustrated, the charging port may comprise a tubular neck arranged at an upward inclination to container 18, and including a screw-threaded end portion 36 upon which cap 34 is applied.

Recharging of container 18 may be performed by means of a bottle 38 of iodine-bearing material, having a large mouth 40 adapted to seal against the open end of neck 32 as the material is poured from the bottle into the container, FIG. 3. The bottle normally is tightly closed with a cap 42. Within cabinet 8 may be provided compartments 44 and 46 for the storage of full and empty charging bottles. The bottles and their caps are constructed of corrosion-resistant material.

When container 18 is charged with iodine-bearing material such as iodine crystals, heated pressurized gas entering the container at 22 is forced upwardly through the crystals for emergence as iodine vapor at pipe 16. As the crystals disintegrate, voids or flues may be formed amongst the crystals allowing the gas to pass through with very little impedance, so that saturation of the gas with iodine vapor may be objectionably reduced. To obviate the formation of such voids or flues, container 18 may be equipped with an agitator for settling the crystals within the container. The agitator may be of any acceptable type suitable for the purpose.

In the embodiment illustrated by FIG. 3, the agitator is shown as a normally stationary screw or spiral element 48 pitched to induce a gravity feed of crystals, but provided with means to rotate or otherwise move the spiral element in aid of crystal gravitation. The means for moving the spiral element may be an exterior crank or handle 50 fixed to the element at 52, whereby said element 48 may be rocked or rotated manually. Should the nature of the iodine-bearing material so require, the spiral element or agitator may be motor driven, continuously or intermittently. As was previously suggested, the material might be maintained at a required density by means other than that illustrated herein.

It may here be noted that the density or compactness of the iodine-bearing material within container 18, is desirably maintained at a value such that a predetermined pressure differential of gas occurs between the inlet and outlet pipes 22 and 16. The pressure differential is recorded upon a gauge 54 (FIG. 4) and is adapted to actuate a pressure responsive electric switch 56 for energizing indicator 14 whenever the pressure differential within container 18 reaches a predetermined low value, thereby indicating a need for agitation, or replenishment, of the iodine-bearing material within the container.

The vaporizing medium, which may be air or other suitable gas, may be supplied by a compressor located either inside or outside of cabinet 8. The source of compressed gas or vaporizing medium is indicated upon FIG. 4 as a supply pipe 58, delivering gas to a heater 60 through a regulator 62. The regulator determines the volume and the pressure at which the gas passes through heater 60. A tube 64 coupled to the heater output pipe 66, connects with a thermostat 67 arranged to maintain the heater at a temperature most favorable for heating the gas to a temperature best suited to vaporization of the iodine-bearing material within container 18 (90° F. to 120° F.)

Gas leaving the heater is conveyed normally by pipe 68, through a normally open solenoid-operated shut-off valve 70, thence by way of pipe 72 through a normally open one-way check valve 74 connected to input pipe 22. The check valve functions to preclude back-flow of iodine-laden gas from container 18 to valve 70 and heater 60. Check valve 74 is constructed of materials resistant to corrosion by iodine.

Heated gas passing from heater 60 through pipes 66 and 68, and through valves 70 and 74, enters the container 18 and is forced upwardly therein to sublimate slowly the iodine-bearing material of the container. The resulting iodine vapor leaves containers 18 by way of pipe 16, and is delivered to the vehicle requiring treatment. In time, however, delivery pipe 16 may become encrusted internally with re-crystallized iodine tending to obstruct the flow of vapor to the coolant tank. The encrustation is removable, however, by purging pipe 16 with heated gas that is caused to by-pass the container 18.

For purging the delivery pipe 16, the piping system may incorporate a by-pass pipe 76 leading from heater 60 directly to delivery pipe 16. The by-pass pipe may be provided with a solenoid-operated shut-off valve 78, and a corrosion-resistant one-way check valve 80, the latter serving to preclude back-flow of iodine vapor to said solenoid valve 78 and heater 60. Thus, when valve 78 is opened and valve 70 is closed, gas free of iodine may flow from heater 60, through pipe 66 and valves 78 and 80, and into delivery pipe 16, until the recrystallized iodine within the delivery pipe has been vaporized and carried to the coolant tank. Such purging of the delivery pipe may be completed in a few minutes.

Upon completion of the purging operation, solenoid valve 78 may be closed and the other solenoid valve 70 may be opened, to restore normal passage of heated gas through the container 18 and into delivery pipe 16 by way of pipes 66, 68, 72 and 22. The solenoids 78 and 70 are adapted to be closed simultaneously to terminate flow of gas through container 18, whenever cap 34 is removed from filler neck 32, this being a safety feature precluding gas injury to the serviceman.

In view of the requirement for periodic purging of delivery pipe 16, an electric timer 82 may be installed within cabinet 8, and wired to the coils of solenoid valves 70 and 78 for periodically opening one of said valves and closing the other, in alternation. That is, the timer may effect an opening of valve 70 and the simultaneous closing of valve 78, for a period of time approximating ten minutes. By this means, a periodic purging of delivery pipe 16 is achieved automatically. Timer 82 may be used also to periodically energize a suitable vibrator operative to agitate the contents of container 18, for precluding bridging or the formation of flues heretofore mentioned.

The reference numeral 84 indicates an air washer within cabinet 8, designed to pick up and wash any iodine-bearing air that may accumulate within the cabinet during recharging of container 18, or that may escape from the system due to possible leakage while the vaporizer is in operation. The washer may operate continuously, by preference, and may include a blower 86 exhausting washed air from the cabinet. A venturi associated with the blower may deliver a portion of the exhaust air to a starch solution or other iodine-detection means for indicating the purity of the washed air exhausted.

As an added safety feature, suitable means may be provided for indicating that blower 86 is in operating condition. Such means may comprise a small window in the blower housing exposing the impeller of the blower to light rays from a fluorescent lighting fixture 88, to produce a stroboscopic effect as the impeller rotates in synchronism with the cyclic emission of rays from the fixture.

The wiring diagram of FIG. 5 is schematic, and may comprise line wires L1 and L2 supplying electric current through a fused main switch 90 which normally is closed-circuited. The motor of blower 86, and the motor 92 of timer 82, may be connected across the line wires for continuous operation of these components. Heater 60 and its controlling thermostat 67 may likewise be connected in the main circuit, usually with the interposition of a relay (not shown) arranged to provide low-voltage circuitry for the thermostat in accordance with common practice. The low-voltage control circuitry has been omitted from the wiring diagram in order to avoid complexity of disclosure, the understanding being that the low-voltage relay-controlled circuit design is well within the skill of the electrician.

At the lower end of the diagram is indicated the pressure differential switch 56 which, as previously explained, operates to energize the warning lamp 14 whenever a drop in pressure of heated air through container 18 indicates a need for replenishment or agitation of the iodine crystals within the container. Warning lamp or signal 14 is arranged to be visible outside the unit cabinet.

Earlier herein was mentioned the desirability of interiorly illuminating the inspection ports 30 of container 18. Lamps for this purpose are indicated upon the wiring diagram at 94, and these lamps as well as the fluorescent lamp 88, may be controlled by a door-operated switch 96 which closes the lamp circuit whenever door 10 is ajar. Thus, when the door is closed and the light of lamps 88, 94, 94 is not needed, switch 96 will be held in open-circuit condition by contact with the cabinet door. As will be understood, each inspection port 30 may be equipped with an interiorly disposed lamp such as 94.

Timer motor 92, by means of conventional relay-controlled circuitry, is operative to normally control the opening and closing of electric switches 97 and 98. These switches are electrically connected in the circuits of the solenoids which actuate the valves 70 and 78. As was previously explained, valve 70 is open, and valve 78 is closed, while the apparatus is generating and delivering iodine vapor to pipe 16. During the generating period, the timer will keep switch 97 closed, and switch 98 open. At the same time, the contacts 100 and 102 of a safety switch 104 will be closed (as will be explained), in order to maintain current flow through switch 97 and the solenoid of valve 70, to assure flow of heated air through valve 70 throughout a time period determined by the timer.

Upon expiration of the generating period determined by the timer, the timer will operate to open-circuit the switch 97, and close-circuit the switch 98, thereby to open solenoid valve 78 and close solenoid valve 70, for a short period of time. During this short period of time, heated air will be directed from heater 60 through pipes 66, 76, and 16, to purge the pipe lines of encrustations. The timer then returns switches 97 and 98 to the normal positions indicated upon the diagram, for restoring the solenoid valves to normal position at which iodine vapor is directed to pipe 16 from container 18 until the timer again operates to purge the pipe lines. This periodic purging of the lines is initiated automatically by the timer. It must be understood that the contacts 100 and 102 of safety switch 104 remain closed throughout the generating and purging sequence.

The safety switch 104 may be incorporated in the electrical system for assuring a complete shut-down of the vapor generator, whenever an attendant or serviceman proceeds to remove the cap 34 for replenishing the supply of iodine-bearing material within container 18. In the absence of means to shut down the generator, iodine vapor might be expelled from filler neck 32, to burn or otherwise injure the attendant or serviceman.

Figure 2:
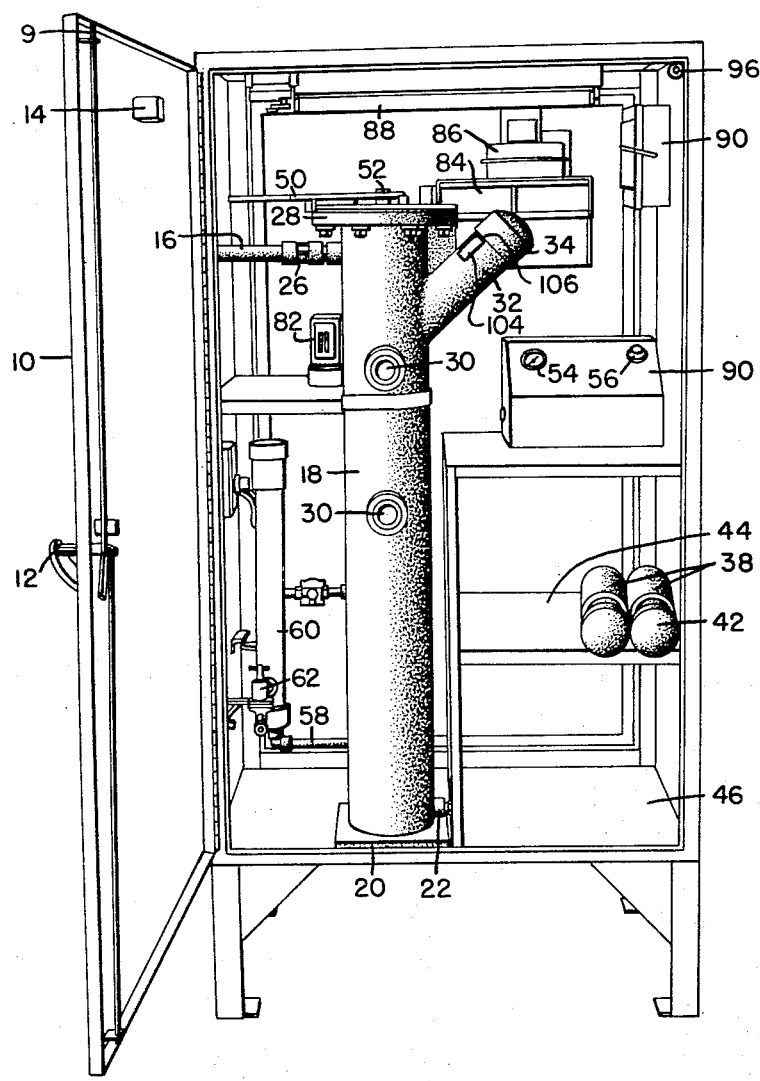
FIG. 2 is a front perspective view of the device, with its cabinet door ajar to show interior construction.

Safety switch 104 may be mounted upon the filler neck 32 (FIG. 2), with its actuator 106 in position to be depressed by cap 34 when the cap is fully seated upon the neck. Such depression of the switch actuator disposes the contacts 100 and 102 to the closed-circuit position (FIG. 5), against the force of a biasing spring 108. Contacts 100 and 102 remain closed so long as cap 34 remains in sealing position upon the filler neck, thereby assuring the aforementioned sequential generating and purging cycles controlled by timer motor 92.

When an attendant opens the cabinet door 10 and proceeds to unscrew the cap 34, the cap will back away from switch actuator 106, permitting spring 108 to open-circuit the switch contacts 100 and 102. This breaks the electrical circuits of both solenoid valves 70 and 78, causing the valves to close and thereby terminate all flow of air through the piping of container 18. Thus, the attendant is protected from any tendency of iodine vapor to blow out from the filler neck.

Upon recharging container 18 with bottled iodine-bearing material, the attendant will replace cap 34, which cap upon seating will again actuate switch 104, to close the contacts 100 and 102 and thereby condition the system for normal operation.

Switch 104 may include a third contactor 110 for controlling a signal device or lamp 112, the purpose of which is to indicate a safe shut-down condition of the vapor generator. Signal device 112 will be energized by the closing of contactor 110, whenever switch contactors 100 and 102 are open-circuited by the unscrewing of cap 34. Contactors 100, 102 and 110 may be movable unitarily with actuator 106, so that contactor 110 is open-circuited while contactors 100 and 102 are closed-circuited, and vice-versa. The signal device or lamp 112 may be installed at any suitable location within cabinet 8.

The system of wiring disclosed herein is exemplary only, and subject to considerable modification or elaboration within the skills of the electrician or circuit designer. As previously mentioned, the electrical system may desirably include low-voltage circuitry for actuating some or all of the electrical components with the degree of efficiency and safety required by various safety codes or regulations.

In constructing the apparatus, care should be exercised to protect all vulnerable components from the destructive effects of iodine vapors. For example, the check valves 74 and 80, and all piping subject to contact with the iodine vapors, should be constructed of PVC (polyvinyl chloride) material or equivalent substance unaffected by iodine. Such material should be employed also in constructing container 18, agitator 48, the removable head 28, and the recharging bottles 38.

Heater 60 may be heated by electrical means, steam, or any known heating medium suitable for the purpose. The container 18, shown herein as a closed upright cylinder, may be of any suitable shape or size, and may incorporate agitating means of a type other than the screw or spiral element suggested herein. The container may be insulated against heat loss, if desired. Moreover, the container need not necessarily be disposed in an upright position in order to perform its intended function.

The foregoing and other modifications and changes may be made in the structural details of the apparatus, within the scope of the appended claims, without departing from the spirit of the invnetion.

What is claimed is:

1. Apparatus for generating and delivering a gaseous bactericide, comprising in combination: a container for solid particles of iodine-bearing material, said container having an inlet port, an outlet port, and a charging opening; means for delivering to the inlet port a metered fluid medium characterized by the ability to effect release of iodine from the material and to form with the released iodine an iodine vapor dischargeable through the outlet port; means for dispersing within a receptive fluid the iodine vapor discharged from the outlet port; and means for replenishing the supply of solid particles within the container, comprising a charging bottle having a neck adapted to seal with the charging opening to preclude escape of free iodine to atmosphere during the replenishing operation.

2. Apparatus as set forth in claim 1, wherein the combination includes: pressure means for driving the fluid medium through the iodine-bearing particles of the container; means for measuring the pressure differential between the inlet port and the outlet port of the container; and means for signalling a predetermined pressure differential of low value indicating an excessively unrestricted movement of fluid medium through the container.

3. Apparatus for generating and delivering a gaseous bactericide, comprising in combination: an upright elongate container for solid particles of iodine-bearing material, said container having an inlet port, an outlet port, and an upper sealable charging opening through which the iodine-bearing particles may be introduced to the container for gravity movement toward the lower end of the container; means for delivering to the inlet port a pressurized fluid medium characterized by the ability to effect release of iodine from the particles and to form with the released iodine an iodine vapor dischargeable through the outlet port; means for establishing a predetermined rate of fluid medium delivery to the inlet port; means for dispersing within a receptive fluid the iodine vapor released through the outlet port; means for measuring pressure differential of fluid medium passing through the inlet port and the outlet port, and including means for signalling a predetermined pressure differential of low value indicating an excessively unrestricted movement of fluid medium through the container; and means to agitate the particles within the container, for inducing gravitation and compacting of the particles therein, in aid of increasing the pressure differential aforesaid.

4. Apparatus as set forth in claim 3, wherein the combination includes: means for selectively delivering fluid medium directly to the iodine dispersing means, bypassing the container of iodine-bearing particles, to purge said dispersing means of iodine condensate accumulated by said dispersing means.

5. Apparatus for generating and delivering a gaseous bactericide, comprising in combination: a container for iodine-bearing material, said container having an inlet port and an outlet port; a source of pressurized gas characterized by the ability to effect release of iodine from the iodine-bearing material and to form with the released iodine an iodine vapor dischargeable through the outlet port; a supply pipe for feeding said pressurized gas to the inlet port; a delivery pipe for iodine vapor connected with the outlet port, and arranged to disperse iodine vapor through a receptive fluid; a by-pass pipe for delivering pressurized gas from the source directly to the delivery pipe, and by-passing the container, for purging the delivery pipe of iodine condensate accumulated therein; and control means operative at intervals, for alternately supplying the pressurized gas to the by-pass pipe and to the inlet supply pipe.

6. Apparatus as set forth in claim 5, wherein the gas utilized is air under pressure heated to a temperature between 90° and 120° F.

7. Apparatus for generating and delivering a gaseous bactericide, comprising in combination: a container for iodine-bearing material, said container having an inlet port, an outlet port, and a sealable charging opening through which such material in replenishment may be introduced to the container; a source of gas under pressure characterized by the ability to effect release of iodine from the iodine-bearing material and to form with the released iodine an iodine vapor dischargeable through the outlet port; a supply pipe for feeding said gas to the inlet port; a heater associated with the supply pipe for heating said gas; a delivery pipe for iodine vapor connected with the outlet port, and arranged to disperse iodine vapor through a receptive fluid; a by-pass pipe for delivering pressured gas from the heater directly to the delivery pipe, and by-passing the container, for purging the delivery pipe of iodine condensate accumulated therein; a first shut-off valve for controlling gas flow through the supply pipe; a second shut-off valve for controlling gas flow through the by-pass pipe; means operative at times to open the first shut-off valve while closing the second shut-off valve, and to close the first shut-off valve while opening the second shut-off valve; a check valve in the supply pipe located to preclude back-flow of gas from the container to the first shut-off valve; a check valve in the by-pass pipe located to preclude back-flow of gas from the delivery pipe to the second shut-off valve; and means for metering the rate of gas flow through the iodine-bearing material of the container.

8. Apparatus as set forth in claim 7, wherein the combination includes: means for signalling a pressure differential of low value developed within the cylinder between the inlet and outlet ports; and means operative for compacting the material within the cylinder, to increase the pressure differential therein.

9. Apparatus for generating and delivering a gaseous bactericide, comprising in combination: a container for iodine-bearing material, said container having an inlet port, an outlet port, and an elevated sealable charging opening through which such material may be added to the container at times; a source of heated gas under pressure characterized by the ability to effect release of iodine from the material of the cylinder, and to form with the released iodine an iodine vapor dischargeable through the outlet port; a supply pipe for feeding said gas to the inlet port; a thermostatically controlled heater for maintaining a temperature of the gas between predetermined limits; a delivery pipe for iodine vapor connected with the outlet port, and arranged to disperse iodine vapor through a fluid receptive thereof; a by-pass pipe for delivering the heated and pressured gas directly to the delivery pipe, and by-passing the container, for purging the delivery pipe of iodine condensate accumulated therein; a first shut-off valve for controlling gas flow through the supply pipe; a second shut-off valve for controlling gas flow through the by-pass pipe; automatic means operative at times to open the first shut-off valve while closing the second shut-off valve, and to close the first shut-off valve while opening the second shut-off valve; check valve means in supply pipe and the by-pass pipe, to preclude back-flow of gas to the shut-off valves; metering means for predetermining the rate of gas flow through the iodine-bearing material of the container; a cabinet having an access door, said cabinet enclosing the material container, the heater, the metering means, and the valves aforesaid; and means within the cabinet for washing the air therein continuously, to remove any traces of accumulated iodine vapors from the cabinet interior.

10. Apparatus as set forth in claim 9, wherein the combination includes; means operative incident to unsealing of the charging opening of the container, for terminating flow of gas through the container.

11. Apparatus as set forth in claim 9, wherein the container includes at least one transparent inspection window for revealing the amount of iodine-bearing material held by the container; an electric illuminator in the container for illuminating the material visible through the window; and means operative incident to opening of the access door of the cabinet, for energizing said illuminator.

12. Apparatus for generating and delivering a gaseous bactericide, comprising in combination: an elongate upright container for iodine-bearing material in solid particle form, said container having an inlet port and an outlet port at opposite ends of the container, and a charging opening intermediate said ends; a tubular filler neck defining the charging opening, said neck being inclined upwardly and outwardly from said opening, the neck having an outer open end, and a removable cap for closing the open end of the filler neck; an inspection window in the side of the container, disposed at an elevation below the level of the charging opening, said window being sealed against escape of iodine vapor; a charging bottle having a large mouth interfitting with the neck of the charging opening to form a seal therewith precluding escape of vapor as the bottle discharges its contents to the filler neck, the capacity of the bottle being less than the combined capacity of the filler neck and that portion of the container which is above the inspection window; means for delivering pressurized heated gas to the container through the inlet port thereof; and means for conveying gas exhausted from the outlet port, to a fluid requiring treatment.

13. Apparatus as set forth in claim 12, wherein the combination includes; means for terminating the flow of gas through the material of the cylinder during the charging procedure.

14. Apparatus for generating and delivering a gaseous bactericide, comprising in combination: an elongate container for iodine-bearing material in solid particle form, said container having an inlet port and an outlet port at opposite ends of the container, and a charging opening intermediate said ends; a tubular filler neck associated with the charging opening, said neck having an outer open end; a removable cap for closing the open end of the filler neck; means for delivering a pressurized gas to the container through the inlet port thereof for sublimating the iodine of the iodine-bearing material within the container; and means automatically operative incident to partial displacement of the removable cap, for terminating flow of pressurized gas to the container.

15. Apparatus as set forth in claim 14, wherein is included means operative to signal an excessive differential of gas pressure drop within the container intermediate the inlet and the outlet ports thereof.

16. A method for treating and disinfecting a mass of fluid, said method comprising: passing a controlled flow of pressurized atmospheric air through a heater and elevating the temperature of the air to a value between 90° F. and 120° F.; conveying the heated air to a container charged with iodine-bearing material in solid particle form, to vaporize iodine released by the particles as the air sweeps therethrough; collecting the iodine-bearing exhaust air from the container and piping said exhaust air to the fluid mass to be treated; terminating the flow of air through the cylinder at prescribed intervals of time, and throughout a brief period of interruption; delivering to the said fluid mass during such brief period of interruption, and through the same piping, a flow of the heated air untreated by the iodine-bearing particles; then resuming delivery of the iodine-treated air to the said fluid mass through said same piping.

References Cited

UNITED STATES PATENTS

| 1,438,071 | 12/1922 | Von Faber | 210—63 X |
| 3,140,922 | 7/1964 | Sterling | 23—264 X |
| 3,230,033 | 1/1966 | Hamilton et al. | 21—53 X |

OTHER REFERENCES

Lesser, M. A.: Air Sterilization, Drug and Cosmetic Industry, December 1946: 59, 6, pp. 771, 772 and 862–865, page 772 particularly relied on.

Wilke, C. R.: Sublimation: Its Applications in Chemical Processing, Chemical Industries, July 1948, pp. 34–38, 122 and 124.

Chambers, C. W., et al.: Iodine as a Bactericide, Soap and Sanitary Chemicals, October 1952, pp. 149–151 and 165 relied on. Wyssmont Advertisement, I & EC, February 1965, back cover.

JOSEPH SCOVRONEK, *Acting Primary Examiner.*

MICHAEL E. ROGERS, MORRIS O. WOLK,
*Examiners.*